(12) United States Patent
Chen et al.

(10) Patent No.: US 12,505,523 B2
(45) Date of Patent: Dec. 23, 2025

(54) DETERMINATION OF A PARAMETER SET FOR A TONE MAPPING CURVE

(71) Applicant: HUAWEI TECHNOLOGIES CO., LTD., Guangdong (CN)

(72) Inventors: Hu Chen, Munich (DE); Yichuan Wang, Beijing (CN); Weiwei Xu, Hangzhou (CN); Quanhe Yu, Beijing (CN); Elena Alexandrovna Alshina, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 17/982,046

(22) Filed: Nov. 7, 2022

(65) Prior Publication Data
US 2023/0054477 A1    Feb. 23, 2023

Related U.S. Application Data

(63) Continuation of application No. PCT/CN2020/089105, filed on May 8, 2020.

(51) Int. Cl.
*G06T 5/92* (2024.01)
*G06T 5/10* (2006.01)
*G06T 5/50* (2006.01)

(52) U.S. Cl.
CPC ............ *G06T 5/92* (2024.01); *G06T 5/10* (2013.01); *G06T 2207/10016* (2013.01); *G06T 2207/20024* (2013.01); *G06T 2207/20208* (2013.01)

(58) Field of Classification Search
CPC ... G06T 5/92; G06T 5/10; G06T 2207/10016; G06T 2207/20024; G06T 2207/20208; G06T 5/50
See application file for complete search history.

(56) References Cited

U.S. PATENT DOCUMENTS

| | | |
|---|---|---|
| 2008/0144692 A1 | 6/2008 | Lonardi et al. |
| 2015/0269714 A1* | 9/2015 | Boitard .................. H04N 23/71 |
| | | 382/274 |
| 2017/0070719 A1* | 3/2017 | Smolic .................. H04N 25/57 |

(Continued)

FOREIGN PATENT DOCUMENTS

| | | |
|---|---|---|
| CN | 105393280 A | 3/2016 |
| EP | 2144444 A1 | 1/2010 |
| JP | 2018525905 A | 9/2018 |

OTHER PUBLICATIONS

Rafa Mantiuk et al, Display Adaptive Tone Mapping, ACM Transactions on Graphics, vol. 27, Issue 3, Aug. 2008, 10 pages.

(Continued)

*Primary Examiner* — Amandeep Saini
*Assistant Examiner* — Emma Rose Goebel

(57) ABSTRACT

The present disclosure relates generally to the field of video processing, and more particularly, to high dynamic range (HDR) image processing. In particular, the present disclosure relates to a method for determining a parameter set for a tone mapping curve. The method comprises obtaining a plurality of parameter sets, wherein each parameter set defines the tone mapping curve, and wherein each parameter set is derived based on one of a plurality of HDR video frames. Further, the method comprises temporally filtering the plurality of parameter sets to obtain a temporally filtered parameter set.

19 Claims, 14 Drawing Sheets

(56) References Cited

U.S. PATENT DOCUMENTS

2017/0103729 A1    4/2017  Huang et al.
2018/0144692 A1*  5/2018  Atkins .................. G06V 20/40
2018/0167597 A1*  6/2018  Seifi ........................ H04N 9/77

OTHER PUBLICATIONS

SMPTE ST 2094-10:2016, SMPTE Standard Dynamic Metadata for Color Volume Transform Application #1, 15 pages.
Document: JVET-E0106, A.M. Tourapis et al., HDRTools: Generalized Scaling and Tone Mapping Support, Joint Video Exploration Team (JVET) of ITU-T SG 16 WP 3 and ISO/IEC JTC 1/SC 29/WG 11, 5th Meeting: Geneva, CH, Jan. 12-20, 2017, 3 pages.
SMPTE ST 2094-20:2016, SMPTE Standard Dynamic Metadata for Color Volume Transform—Application #2, 23 pages.
SMPTE ST 2094-30:2016, SMPTE Standard Dynamic Metadata for Color Volume Transform—Application #3, 15 pages.
SMPTE ST 2094-40:2016, SMPTE Standard Dynamic Metadata for Color Volume Transform—Application #4, 26 pages.
Ishtiaq Rasool Khan, et al., "Tone-Mapping Using Perceptual-Quantizer and Image Histogram," IEEE Access, vol. 8 (published on Feb. 11, 2020),total: 9pages.

* cited by examiner

DETERMINATION OF A PARAMETER SET FOR A TONE MAPPING CURVE

CROSS-REFERENCE TO RELATED APPLICATIONS

This application is a continuation of International Application No. PCT/CN2020/089105, filed on May 8, 2020. The disclosure of the aforementioned patent application is hereby incorporated by reference in its entirety.

TECHNICAL FIELD

The present disclosure relates generally to the field of video processing, and more particularly to high dynamic range (HDR) video or image processing. In particular, the present disclosure relates to a method for determining a parameter set for a tone mapping curve for tone mapping HDR video frames. Moreover, the disclosure also relates to an encoder and decoder for, respectively, encoding or decoding HDR video frames. The encoder or decoder may be configured to perform the method.

BACKGROUND

In digital imaging, the dynamic range can define the luminance range of a scene being photographed, the limits of the luminance range that a given digital camera or film can capture, or the luminance range that a display is capable of In fact, the dynamic range of a typical real world scene is often between $10^{-3}$ nit and $10^6$ nit. In comparison, a consumer display typically has a much smaller dynamic range. If it is desired to display such a real world scene on such a display, there is the need to scale down the HDR to a lower dynamic range: this process is called tone mapping. Tone mapping is, generally, a non-linear mapping.

In HDR image and video processing, a Perception Quantization (PQ) curve is often used, in order to transfer an optical signal in nit or $cd/m^2$ to an electric signal between 0 and 1. The equation for a typical PQ curve is given in the following:

$$L' = PQ\_TF(L) = \left(\frac{c_1 + c_2 L^{m_1}}{1 + c_3 L^{m_1}}\right)^{m_2}$$

wherein L is the brightness value in the linear domain, and ranges between 0 nit to 10000 nit, and L can be R value or G value or B value or the luminance component Y.

L' denotes the electric signal in the PQ domain, and is included in the range [0,1], which is often referred to as PQ value or value in the PQ domain.

$$m_1 = \frac{2610}{4096} \times \frac{1}{4} = 0.1593017578\,125,$$

$$m_2 = \frac{2523}{4096} \times 128 = 78.84375,$$

$$c_1 = c_3 - c_2 + 1 = \frac{3424}{4096} = 0.8359375,$$

$$c_2 = \frac{2413}{4096} \times 32 = 18.8515625,$$

$$c_3 = \frac{2392}{4096} \times 32 = 18.6875$$

The input of the PQ transfer function is the optical signal in the linear domain, and the output is the electric signal in the PQ domain. Because there is a one-to-one mapping, the input and output values are actually equivalent, if no quantization is applied. Only they are in two different domains, i.e. the linear domain and the PQ domain.

A PQ Optical-Electro Transfer Function (PQ OETF) is often used for quantization. The HDR images in the linear domain are first transferred to the PQ domain, and then quantized to 10 bits or 12 bits. The images in the PQ domain are either stored or compressed by a codec. The quantization in the PQ domain is more uniform to human visual system, because the human visual system is non-linear. If quantization was conducted in the linear domain, a perceptual distortion would be much larger.

As mentioned above, display dynamic range and peak brightness are often smaller than that of a real world scene, or of a source HDR image or video. Thus, tone mapping can be used, in order to adapt e.g. HDR video frames to the display. A non-linear curve can be used for the tone mapping. If the tone mapping curve is the same for all HDR video frames in a video sequence, it is referred to as static tone mapping. Static tone mapping, however, is non-optimal, because it is not adapted to image statistics of each HDR video frame. In comparison, dynamic tone mapping is adapted to statistics of each HDR video frame and, thus, the tone mapping curve is different from frame to frame. Dynamic tone mapping is supposed to make the best of the dynamic range of the display and, thus, to have a higher quality.

Dynamic tone mapping, however, is more difficult to control, and one common issue is flickering. Because the image statistics are different from frame to frame, so are the tone mapping curves. In specific applications, metadata, which contains key information or features of the contents to guide the tone mapping procedure, play an essential role as the "bridge" between a source (encoder) and receiver (decoder). However, the contents may change a lot between consecutive frames in some situations, and thus also the metadata and the corresponding tone mapping curve may change. This may result in the instability of the display and the phenomenon named "flickering".

Existing approaches to solve the flickering issue mentioned above, are given by dynamic tone mapping schemes standardized, for instance, in SMPTE 2094-10, SMPTE 2094-20, SMPTE 2094-30, and SMPTE 2094-40, as it will be elucidated in the following. Dynamic tone mapping means that the tone mapping curve parameters are computed adaptively, i.e. are adapted to changing image, and are thus different from frame to frame. Dynamic tone mapping enables a more efficient use of the dynamic range of the display. These existing approaches however, do not satisfyingly solve the flickering issue.

A conventional method 1400, proposed by Rafal Mantiuk et al. (Display Adaptive Tone Mapping, ACM Transactions on Graphics 27(3), August 2008), comprises an anti-flickering filter for dynamic tone mapping, and is illustrated in FIG. 14. In this method 1400, dynamic metadata are extracted 1401 from the HDR source (e.g., HDR video frames) and a corresponding tone mapping curve is generated 1402 based on the metadata. Then, in order to overcome the flickering, when the tone mapping curve changes rapidly, the tone mapping curve is temporally filtered 1403 before performing the tone mapping 1404. In particular, a windowed linear-phase FIR digital filter is applied to the nodes of the tone mapping curve, before getting the final tone mapping result. However, this method has the disadvantage that it requires that the tone mapping curves for previous frames are saved in a memory. Furthermore, temporally filtering the complete tone mapping curve is a rather complex process. For example, if a look-up-table (LUT) of 128 values is used to represent the tone mapping curve, and a filtering window with a size of 16 is adopted, 128 times 16 values need to be stored in the memory.

SUMMARY

In view of the above-mentioned problems and disadvantages, embodiments of the present disclosure aim to provide an efficient method for improving the quality of HDR videos or video frames, e.g. reducing flickering.

The object is achieved by the embodiments provided in the enclosed independent claims. Advantageous implementations of the embodiments are further defined in the dependent claims. According to a first aspect, the disclosure relates to a method for determining a parameter set for a tone mapping curve, the method comprising: obtaining a plurality of parameter sets, wherein each parameter set defines a tone mapping curve, and wherein each parameter set is derived based on one of a plurality of HDR, video frames and temporally filtering the plurality of parameter sets to obtain a temporally filtered parameter set.

According to the method of the first aspect, not the tone mapping curve itself is temporally filtered, but the parameter set defining the tone mapping curve is temporally filtered. Thus, both time and computing resources can be saved. In particular, a computation complexity and memory requirements become smaller compared to when temporally filtering the entire tone mapping curve.

In addition, a tone mapping curve can be obtained based on the temporally filtered parameter set, with which the stability of a displayed content (in particular HDR video) is improved with reduced or even no flickering. In particular, the flickering is reduced even when the scene changes rapidly between consecutive HDR video frames of the plurality of HDR video frames.

The metadata may be, or may include, statistical data defining brightness characteristics of the HDR frame, e.g. derived or extracted from the HDR frame and/or other HDR frames, e.g. of a same scene.

The method may be performed (e.g., completely or partially) by an electronic device such as an encoder, a decoder, a system comprising an encoder and a decoder, an HDR system, an HDR television (TV), an HDR color grading software, an HDR video transcoder, etc.

In an implementation form of the first aspect, the temporal filtering of the plurality of parameter sets comprises calculating a weighted average or an average of at least a part of parameters of the plurality of parameter sets.

This provides a efficient and effective way to temporally filter the parameter sets.

In an implementation form of the first aspect, the method further comprises generating the tone mapping curve based on the temporally filtered parameter set.

The tone mapping curve generated in this way leads to reduced flickering, particularly when the plurality of HDR video frames are displayed on a display with lower dynamic range than the HDR video frames.

In an implementation form of the first aspect, each parameter set directly or indirectly defines the tone mapping curve.

For instance, a parameter set directly defining the tone mapping curve may comprise a curve parameter. A parameter set indirectly defining the tone mapping curve may comprise metadata, from which such a curve parameter may be calculated.

In an implementation form of the first aspect, each parameter set comprises metadata of the HDR video frame or one or more curve parameters of the tone mapping curve.

In an implementation form of the first aspect, each parameter set comprises metadata extracted from the respective HDR video frame, and the temporally filtered parameter set comprises temporally filtered metadata.

In an implementation form of the first aspect, the method further comprises computing one or more curve parameters of the tone mapping curve based on the temporally filtered metadata.

In an implementation form of the first aspect, the method further comprises generating the tone mapping curve based on the one or more curve parameters.

In this way, the flickering issue described above can be reduced based on temporally filtering metadata instead of the tone mapping curve itself.

In an implementation form of the first aspect, each parameter set comprises one or more curve parameters of the tone mapping curve computed based on metadata extracted from the respective HDR video frame, and the temporally filtered parameter set comprises one or more temporally filtered curve parameters.

In an implementation form of the first aspect, the method further comprises generating the tone mapping curve based on the one or more temporally filtered curve parameters.

In this way, the flickering issue described above can be reduced based on temporally filtering curve parameters of the tone mapping curve, instead of the tone mapping curve itself.

In an implementation form of the first aspect, the tone mapping curve is given by:

$$L' = m\_a \left( \frac{m\_p \times L^{m\_n}}{(m\_p - 1) \times L^{m\_n} + 1} \right)^{m\_m} + m\_b,$$

wherein L is a brightness of an input pixel of a HDR video frame, m_n is a first value, particularly m_n=1, m_m is a second value, particularly m_m=2.4, and m_b is a predetermined perception quantization (PQ) value, wherein m_p is a brightness control factor and m_a is a scaling factor defining a maximum brightness of an output pixel, and wherein the one or more curve parameters comprise m_p and m_a.

This tone mapping curve is also referred to as phoenix curve, and leads to particular low flickering and stability when displaying the HDR video frames on a low dynamic range display.

In an implementation form of the first aspect, the method further comprises transmitting or storing the temporally filtered parameter set as supplementary/side information, e.g. as basic metadata or artistic metadata together with the plurality of HDR video frames.

In an implementation form of the first aspect, the method further comprises obtaining a first parameter set of a first HDR video frame and pushing the first parameter set into a queue, obtaining a second parameter set of a second HDR video frame, detecting if there occurred a scene change between the first HDR video frame and the second HDR video frame, and pushing the second parameter set into the queue if there occurred no scene change, computing an average of the parameter sets in the queue, to obtain the temporally filtered parameter set.

This provides a simple but efficient way for temporally filtering the parameter set, and obtaining the temporally filtered parameter set.

In an implementation form of the first aspect, the method further comprises clearing the queue, if there occurred a scene change.

A scene change may be detected by the method, for example, based on one or more characteristics is (e.g., image statistics) of the HDR video frame(s), which e.g. change rapidly/drastically in case of a scene change.

In an implementation form of the first aspect, the method is performed by an encoder and/or by a decoder.

According to a second aspect, the disclosure relates to an encoder for encoding HDR video frames, wherein the encoder is configured to perform the method according to the first aspect and/or any of the implementation forms of the first aspect.

According to a third aspect, the disclosure relates to a decoder for decoding HDR video frames, wherein the decoder is configured to perform the method according to the first aspect and/or any of the implementation forms of the first aspect.

According to a fourth aspect, the disclosure relates to a system for generating a tone mapping curve, the system comprising an encoder according to the second aspect and/or a decoder according to the third aspect.

The encoder, decoder and system achieve the same advantages and effects as described above for the method of the first aspect and its implementation forms.

According to a fifth aspect, the disclosure relates to a computer program comprising a program code for performing a method according to the first aspect and/or any implementation form thereof, when executed by a processor, in particular when executed by a processor of the encoder according to the second aspect and/or by a processor of the decoder according to the third aspect.

According to a sixth aspect, the disclosure provides a non-transitory storage medium storing executable program code which, when executed by a processor, causes the method according to the first aspect and/or any of its implementation forms to be performed.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms (embodiments of the disclosure) will be explained in the following description of specific embodiments in relation to the enclosed drawings, in which.

DETAILED DESCRIPTION OF EMBODIMENTS

Figure 1:
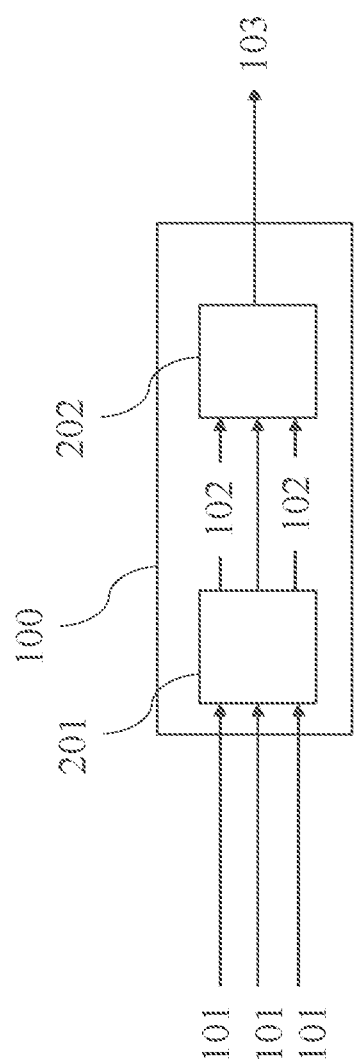
FIG. 1 shows a schematic representation of a device (e.g., an encoder or decoder for, respectively, encoding and decoding HDR video frames) according to an embodiment.
Figure 2:
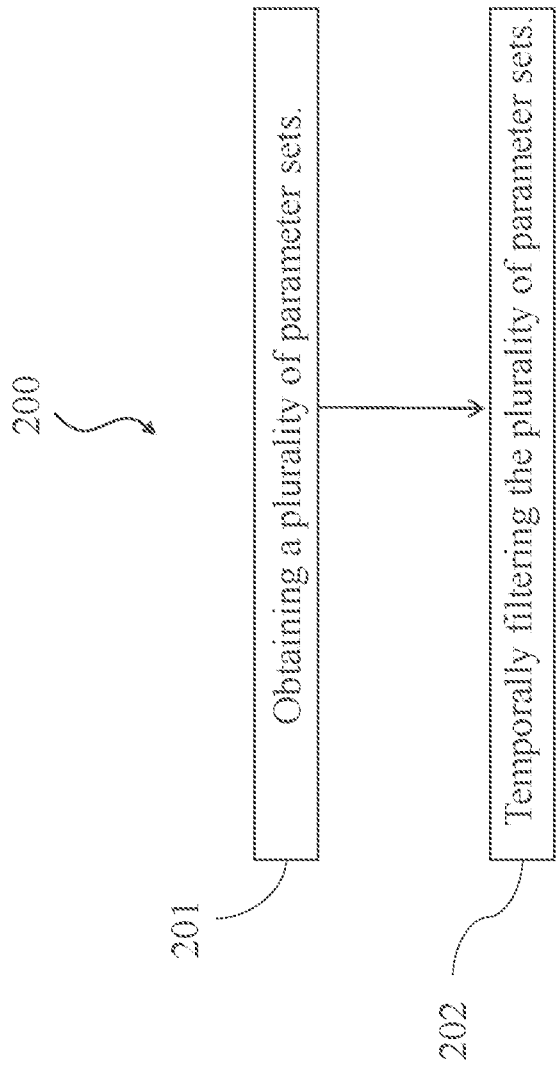
FIG. 2 shows a schematic diagram of a method for determining a parameter set for a tone mapping curve, according to an embodiment.

FIG. 1 shows a schematic representation of a device 100 according to an embodiment of the disclosure. The device 100 may be an encoder for encoding HDR video frames 101. Alternatively, the device 100 may be a decoder for decoding HDR video frames 101. The device 100 may be configured to perform a method 200 (see also the schematic diagram of the method 200 shown in FIG. 2) for determining a parameter set for a tone mapping curve 300 (see e.g., FIG. 3 for exemplary tone mapping curves 300). In particular, the determined parameter set may further be used by the decoder to generate the tone mapping curve 300. The tone mapping curve 300 can then be used to tone map the HDR video frames 101.

A system (see e.g., FIG. 7-FIG. 11 for various examples of such systems) may further be formed, comprising at least one such encoder and/or one such decoder. In particular, the device 100 according to an embodiment of the disclosure usually operates in such a system. In the system, generally an HDR video bit stream is sent from the encoder to the decoder. The bit stream may include the HRD video frames 101 and various kinds of metadata.

Figure 13:
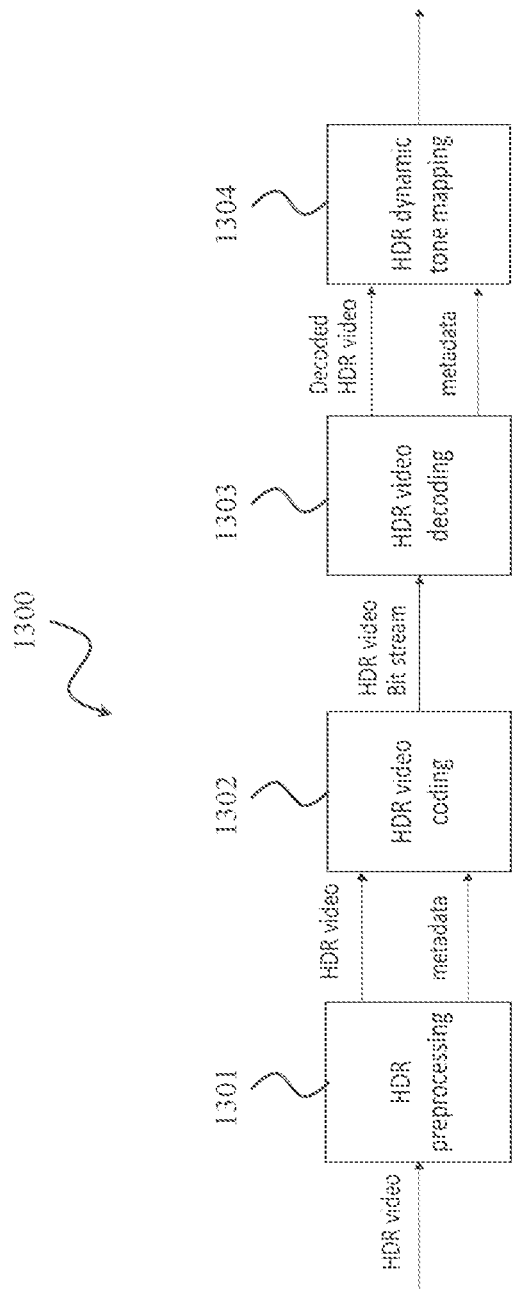
FIG. 13 shows an example of an exemplary pipeline of an HDR dynamic tone mapping process.
Figure 14:
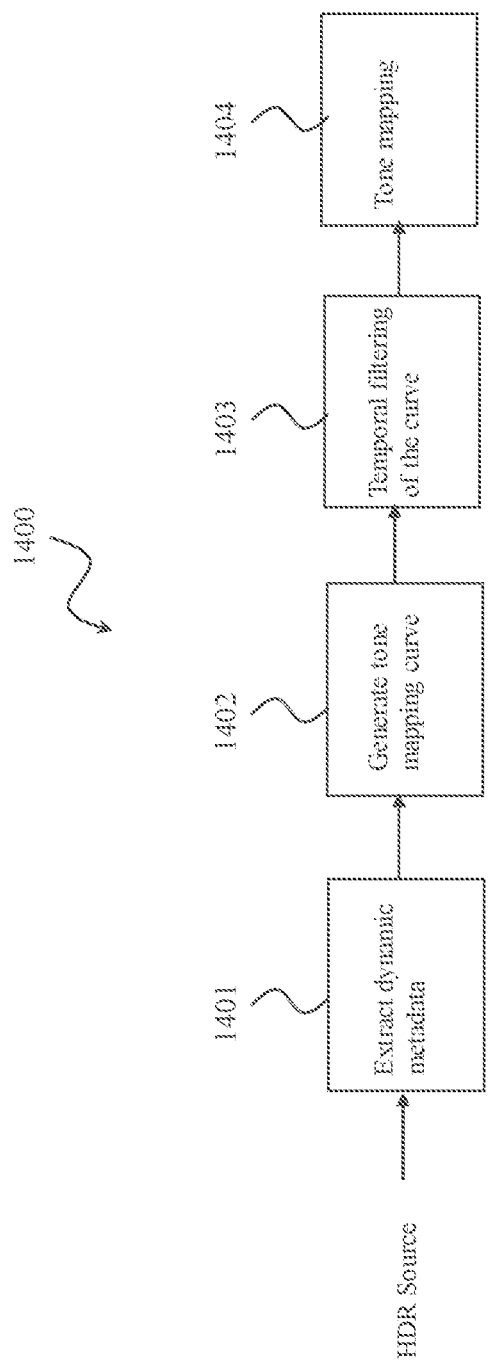
FIG. 14 shows a schematic representation of a conventional approach for addressing the flickering issue by temporally filtering a tone mapping curve.

Notably, embodiments of the disclosure may be implemented in blocks 1301/1302 or blocks 1303/1304 of a pipeline 1300 as shown in FIG. 13 (in particular showing a system of an encoder and decoder). In particular, the method 200 may be performed in these blocks, either at the decoder or the encoder.

The device 100 may be configured (with reference to FIG. 2 and FIG. 3) to obtain 201 a plurality of parameter sets 102, wherein each parameter set 102 defines a tone mapping curve 300, and wherein each parameter set 102 is derived based on one of a plurality of HDR video frames 101, e.g., previously processed HDR video frames 101 (encoder) or coded HDR video frames 101 (decoder). Further, the device 100 is configured to temporally filter 202 the plurality of parameter sets 102, to obtain a temporally filtered parameter set 103.

Thereby, as will be explained later in more detail, each parameter set 102 may comprise metadata 402 (see e.g., FIG. 4 for exemplary metadata 402, referred to as basic metadata 402 in FIG. 4) of the respective HDR video frame 101. The metadata 402 may, for instance, be extracted (i.e., as obtaining step 201) from the respective HDR video frame(s) 101. The metadata 402 may then be temporally filtered 202 to obtain temporally filtered metadata 402 (see e.g., FIG. 7), and one or more curve parameters 502 (see e.g., FIG. 4 for exemplary curve parameters 502) of the tone mapping curve 300 may be computed based on the temporally filtered metadata 403. Further, the tone mapping curve 300 may be generated based on the one or more curve parameters 502.

Alternatively, each parameter set 102 may comprise one or more curve parameters 502 of the tone mapping curve 300. The one or more curve parameters 502 of the tone mapping curve 300 may be computed (i.e., as obtaining step 201) based on metadata 402 extracted from the respective HDR video frame(s) 101. The curve parameters 502 may be temporally filtered 202, to obtain temporally filtered curve parameters 503 (see e.g., FIG. 9), and the tone mapping curve 300 may then be generated based on the temporally filtered curve parameters 503.

The temporal filtering 202 of the parameter set 102 (i.e., either the metadata 402 or the curve parameters 502) may be done at the encoder or decoder (thus acting as the device 100; various embodiments are explained later with respect to FIG. 7-FIG. 12). Generating the curve parameters 502 based on the temporally filtered metadata 402 may also be done at the encoder or the decoder. The tone mapping curve 300 is typically generated at the decoder. The temporal filtering 202 of the parameter sets 102 instead of the tone mapping curve 300 itself leads to various advantages, as previously explained.

The device 100 (encoder or decoder) may comprise a processing circuitry (not shown in FIG. 1) configured to perform, conduct or initiate the various operations of the device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the device 100 to perform, conduct or initiate the operations or methods described herein.

In particular, the device 100 may comprises a processor for executing a computer program comprising a program code for performing the method 200, i.e. for controlling the device 100 to perform the above-mentioned steps of obtaining 201 the parameter sets 102 and temporally filtering 202 the parameter sets 102 to obtain the filtered parameter set 103.

According to embodiments of the disclosure, an exemplary tone mapping curve 300, which is also be referred to as "phoenix curve" in this disclosure, may be given by:

$$L' = m\_a \times \left( \frac{m\_p \times L^{m\_n}}{(m\_p - 1) \times L^{m\_n} + 1} \right)^{m\_m} + m\_b$$

wherein L is a brightness of an input pixel of HDR video frame(s) 101, m_n is a first value, particularly m_n=1, m_m is a second value, particularly m_m=2.4, and m_b is a predetermined perception quantization (PQ) value, wherein m_p is a brightness control factor and m_a is a scaling factor defining a maximum brightness of an output pixel.

Other embodiments using the "phoenix curve" may use other parameters, e.g. m_m may be in a range from 1 to 5, and m_n may be in a range from 0.5 to 2.

Embodiments may use other non-linear tone-mapping curves (other than the "phoenix curve"), conduct temporal filtering of the metadata used to define these other non-linear curves or conduct temporal filtering of the curve parameters directly of these other non-linear curves.

The curve parameters 502 mentioned above may, in particular, comprise the parameters m_p and m_a.

The temporally filtered parameter set 103 may be used by the decoder to generate such a phoenix tone mapping curve 300. Thereby, the filtering of the parameters set 102 may be done by the encoder or the decoder. For instance, the temporally filtered parameter set 103 may comprise temporally filtered curve parameters 503 including the parameters m_p and m_a.

Thereby, the parameter m_p has the physical meaning of a brightness control factor, and the larger m_p, the higher the brightness is. Moreover, m_a is a scaling factor that controls the maximum output brightness of the tone mapping performed with the tone mapping curve 300. The tone mapping curve 300 can be designed in the PQ domain. In other words, the input L and output of the tone mapping curve 300 can both refer to PQ values. The input L ranges from 0 to 1, where PQ value of 0 is 0 nit in linear domain and PQ value of 1 is 10000 nit in linear domain. The output value ranges from 0 to a PQ value that is equal to or below the maximum display brightness in PQ domain.

Figure 3:
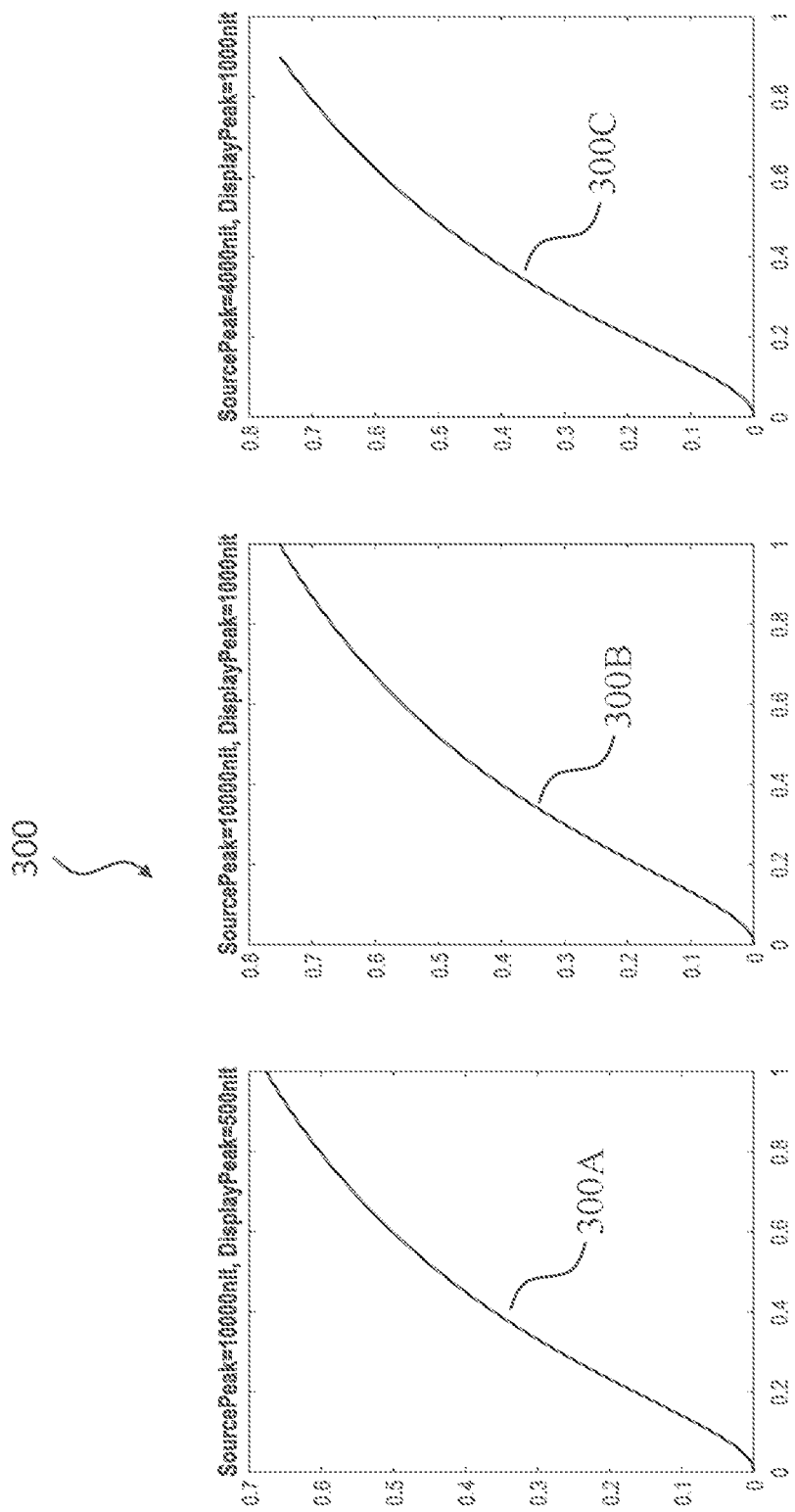
FIG. 3 shows different exemplary tone mapping curves, which may be generated by a decoder based on the determined parameter set, according to an embodiment.

A few examples 300A, 300B, and 300C of the tone mapping curve 300 with different maximum input brightness and maximum display brightness are plotted in FIG. 3. The exemplary tone mapping curves 300A, 300B, and 300C, which may be generated by the decoder, are particularly generated based on a different maximum input brightness (e.g., related to the HDR video frames 101) and a maximum display brightness (e.g., of a display to which the HDR video frames 101 is to be tone mapped). Moreover, as an example, m_p=5.0. The tone mapping curve 300A may be generated by the decoder based on a maximum input brightness of 10000 nit and a maximum display brightness of 500 nit. Further, the tone mapping curve 300B may be generated by the decoder based on a maximum input brightness of 10000 nit and a maximum display brightness of 1000 nit. Moreover, the tone mapping curve 300C may be generated by the decoder based on a maximum input brightness of 4000 nit and a maximum display brightness of 1000 nit.

Figure 4:
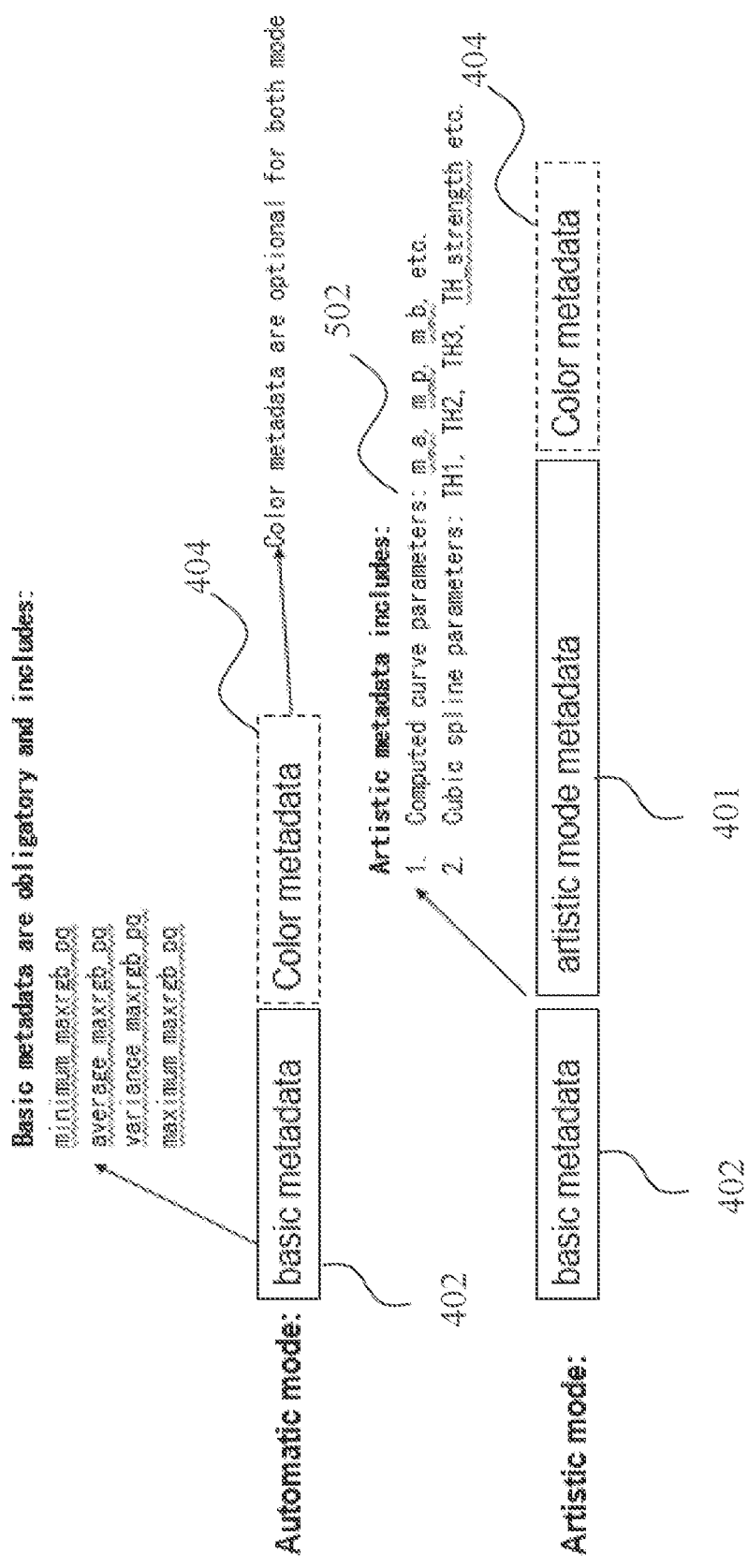
FIG. 4 shows a schematic representation of exemplary metadata for different modes of operation.

There may be different modes, in which a system of encoder and decoder operates, and wherein embodiments of the disclosure may be applied differently. Depending on the mode of the system, the encoder and decoder may be operated differently, and the device 100 may be either the encoder or the decoder. That is, the method 200 according to embodiments of the disclosure may be performed in the encoder or the decoder depending on the mode. The encoder and decoder may generally have different roles in the modes As an example, with reference to the China Ultra-HD Video Industrial Alliance (CUVA) HDR standard (CUVA HDR standard), a first mode may hereinafter be referred to as "automatic mode", and a second mode may hereinafter be referred to as "artistic mode". In both of these modes, the parameter set 102 defining the tone mapping curve 300 may be temporally filtered 202, as described above. These two modes of the CUVA HDR standard are briefly explained in the following:

Automatic mode (mode flag tone_mapping_mode=0). In this first mode, the curve parameters 502 for generating the tone mapping curve 300 are computed based on (basic) metadata 402 at the decoder. The metadata 402 (or temporally filtered metadata 403 in some embodiments) is provided to the decoder by the encoder. Exemplary metadata 402 is shown in FIG. 4, and may include typical image statistics, e.g., it may include—with respect to one or more HDR video frame(s) 101—a minimum brightness value, a max brightness value, an average brightness value, and/or a variance of brightness values. The metadata 402 (or temporally filtered metadata 403 in some embodiments) may comprise a minimum set of parameters that may be sufficient to compute the curve parameters 502. For example, the metadata 402 may include the four parameters as follows (with reference to the CUVA HDR standard):

minimum_maxrgb_pq: minimum of the maxrgb values of all pixels in a frame. Values are in PQ domain.

average_maxrgb_pq: average of the maxrgb values of all pixels in a frame.

variance_maxrgb_pq: the difference between the maxrgb value of the $90^{th}$ percentile of maxrgb values of all the pixels in a frame and that of $10^{th}$ percentile of all the maxrgb values in a frame maximum_maxrgb_pq: maximum of the maxrgb values of all pixels in a frame. Values are in PQ domain.

Therein, the maxrgb value of a pixel is the maximum of R, G and B values of a pixel. The values are in the PQ domain. And all the four parameters given above are values in the PQ domain (thus each value name ends with _pq).

Artistic mode (mode flag tone_mapping_mode=1). In this second mode, the one or more curve parameters 502 may be determined, for example, computed using an algorithm at the stage of the content production or at the stage of the transcoding. In the artistic mode, additional cubic spline parameters such as TH1, TH2, TH3, TH-strength and computed "phoenix" curve parameters 502 such as m_a, m_p, m_b may be used. As shown exemplarily in FIG. 4, the computed curve parameters 502 (or temporally filtered curve parameters 503 in some embodiments) may be added to the metadata 402 (as further metadata 401, e.g., as "artistic mode metadata") to form extended metadata including the metadata 402, the further metadata 401, and optionally color metadata 404. The extended metadata may be transmitted to the decoder. The decoder may then be configured to use the curve parameters 502 (or temporally filtered curve parameters 503 in some embodiments) for directly performing tone mapping (i.e., for generating the tone mapping curve 300 based on the curve parameters 502 or temporally filtered curve parameters 503, and perform the tone mapping with the generated tone mapping curve 300), if the curve parameters 502 or 503 are appropriate for the display on which the HDR video frames 101 are to be displayed. The decoder can also be configured to discard these precomputed curve parameters 502 or 503, and fall back to automatic mode, i.e., the decoder may compute new curve parameters 502 based on the metadata 402. A combination of the two is also possible. In particular, artistic mode means that curve parameters 502 or 503 may be precomputed and transmitted as further metadata 401 by the encoder to the decoder. Color-related metadata 404 can also follow, but they are optional.

It is worth to be noting that the "artistic mode" does not necessarily mean that a human artist or colorist is involved. Artificial intelligence (AI) may replace a human artist or colorist in color grading and help in determining the curve parameters 502. Therefore, the fundamental difference between automatic and artistic mode, according to the above definition, is that only the (basic) metadata 402 is transmitted in the automatic mode, whereas the curve parameters 502 or 503 may be computed at the encoder and embedded in the extended metadata in the artistic mode.

In the following, a way of computing the curve parameters 502, particularly the parameters m_p and m_a, based on the (basic) metadata 402 is described with respect to FIG. 4. Apart from the four parameters in the metadata 402, all other variables may either be intermediate ones or preset values. Therefore, the curve parameters 502, i.e., m_a and m_p, can be determined given the four parameters in the exemplary basic metadata 402. Reference is made to the CUVA HDR standard for the parameters used in the following.

Firstly, intermediate values of MAX1 and max_lum may be computed. Herein, two parameters of the metadata 402, i.e. average_maxrgb and variance_maxrgb, may be used.

$$MAX1 = \frac{B \times \text{maximum\_maxrgb} + A \times (2 \times \text{average\_maxrgb}) +}{(1 - A - B) * (2 \times \text{variance\_maxrgb})}$$

$$\text{max\_lum} = \begin{cases} \text{Max}RefDisplay & MAX1 > \text{Max}RefDisplay \\ MAX1 & MAX1 \geq MIN \&\& MAX1 \leq \text{Max}RefDisplay \\ MIN & MAX1 < MIN \end{cases}$$

A, B are preset weighting factors, MIN is a preset value of lower threshold for max_lum. MaxRefDisplay is the peak brightness of a reference display. The reference display is the display, on which a colorist displays the HDR video on during color grading. A standard reference display peak brightness may be 1000 nit or 4000 nit, although there may also be other values in practice.

Secondly, the parameter m_p may be computed as follows:

$$m\_p = \begin{cases} p_{valueH0} & avgL > TPH0 \\ p_{valueH0} \times g0(w0) + p_{valueL0} \times (1 - g0(w0)) & avgL \geq TPL0, avgL \leq TPH0 \\ p_{valueL0} & avgL < TPL0 \end{cases}$$

Therein, avgL is the average of the maxRGB values of all pixels in a frame, TPL0 and TPH0 are preset thresholds for avgL, PvalueH0 and PvalueH1 are preset threshold values for m_p, and g0(w0) is the weight.

Thirdly, the parameter m_p may be updated using max_lum:

$$m\_p = \begin{cases} m\_p + p_{deltaH1} & max\_lum > TPH1 \\ m\_p + p_{deltaH1} \times g1(w1) + & max\_lum \geq TPL1, \\ p_{deltaL1} \times (1 - g1(w1)) & max\_lum \leq TPH1 \\ m\_p + p_{deltaL1} & max\_lum < TPL1 \end{cases}$$

Therein, TPL1 and TPH1 are preset threshold values for max_lum, PdeltaH1 and PdeltaL1 are preset threshold values for m_p offset, and g1(w1) is the weight.

Finally, the parameter m_a may be computed using m_p. In this step, the other intermediate value H(L) is calculated.

$$H(L) = \left(\frac{m\_p \times L}{(1 \times m\_p - 1) \times L + 1}\right)^{2.4}$$

m_a = (Max*DISPLAY* − Min*DISPALY*)/(*H*(Max*Source*) − *H*(Min*Source*))

Therein, MaxDISPLAY and MinDISPLAY mean the maximum and minimum brightness of the display, and MaxSource and MinSource means the maximum and minimum brightness (maxRGB value) of the source HDR video.

Figure 5:
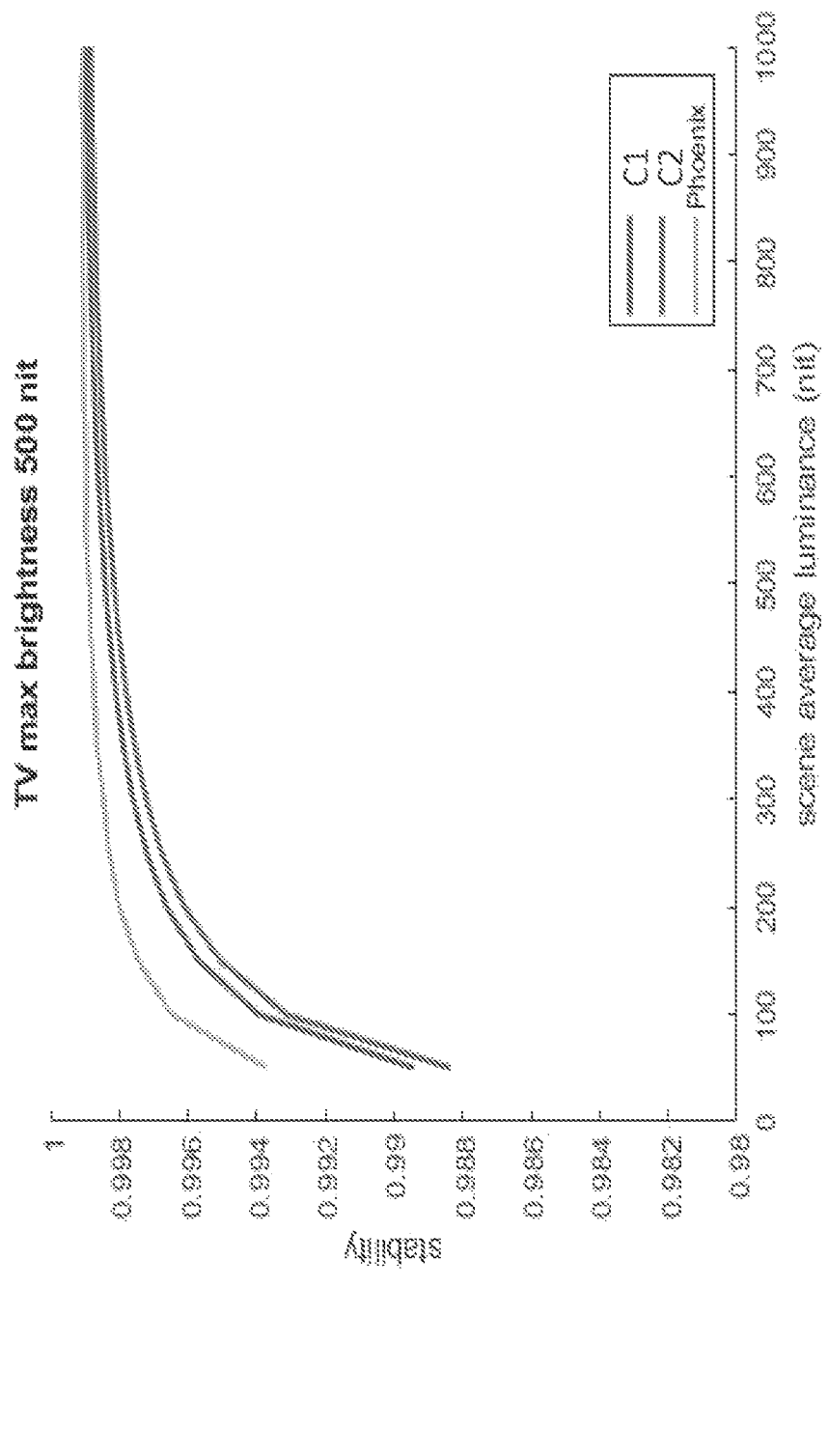
FIG. 5 shows a performance comparison of two tone mapping curves according to conventional examples, and a tone mapping curve generated according to an embodiment.

Advantageously, the tone mapping curve 300, e.g. generated according to embodiments of the disclosure, is more stable than conventional tone mapping curves, as is shown in FIG. 5, wherein C1 and C2 represent conventional tone mapping curves (graph C1 being the graph in the middle and C2 the lower graph of the three graphs) and "phoenix" represents a tone mapping curve 300 (improved performance shown by the upper graph of the three graphs in FIG. 5) according to an embodiment of the disclosure (as e.g., the examples shown in FIG. 3). Because the 'phoenix' tone mapping curve 300 is intrinsically more stable than the conventional tone mapping curves, it is unnecessary to spend much computation to temporally filter the entire tone mapping curve 300. Therefore, according to embodiments of the disclosure, only the parameter sets 102 (metadata 402 or curve parameters 502) can be temporally filtered 202 instead. Compared to temporally filtering the complete tone mapping curve 300, which would, for instance, be stored in a look-up table (LUT) of 128 values, for example, the metadata 402 may contain only the four parameters described above. Thus, temporally filtering 202 e.g., the metadata 402 is 128/4=32 times more efficient than filtering the tone mapping curve 300 completely.

Figure 6:
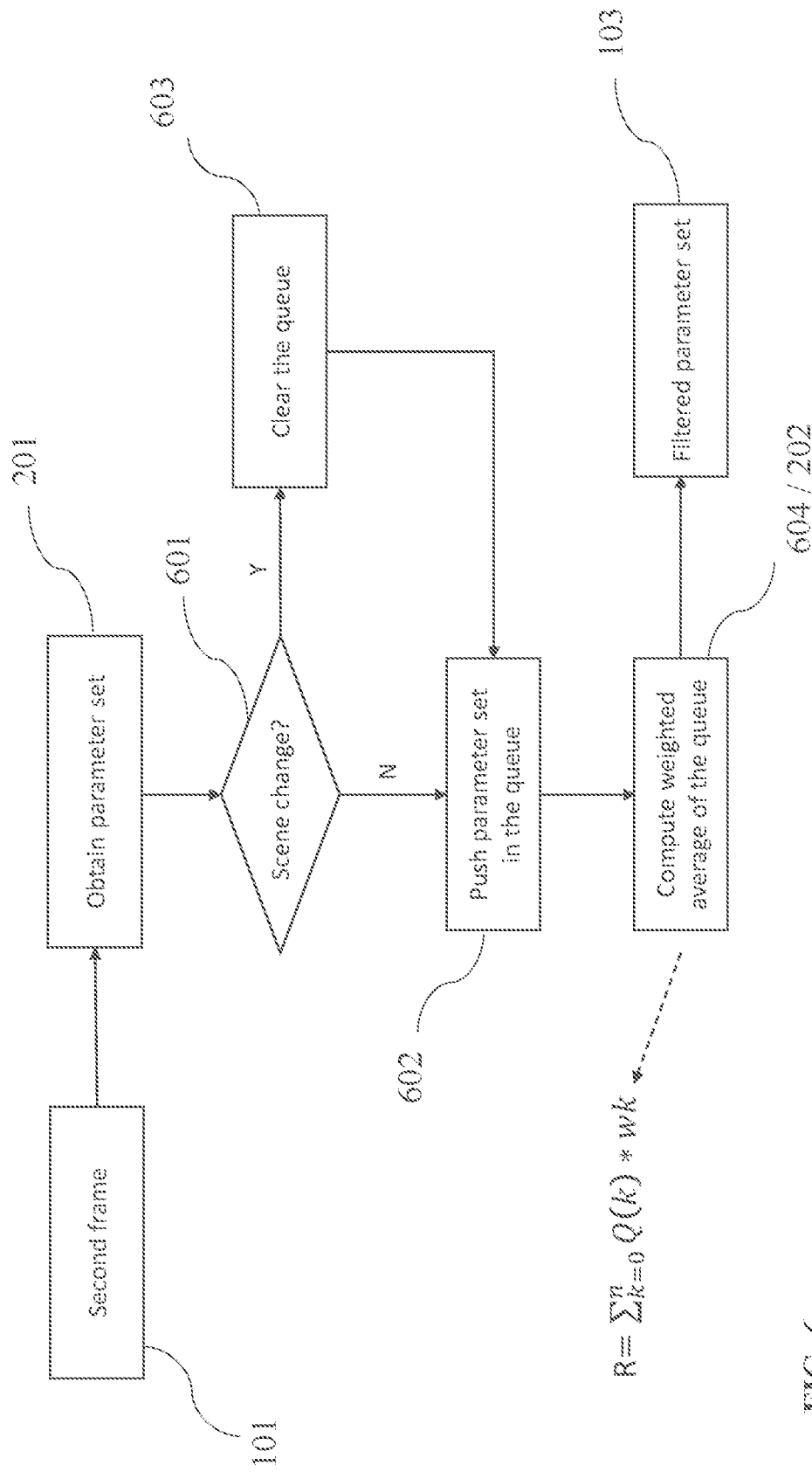
FIG. 6 shows a schematic diagram of a procedure for temporally filtering the plurality of parameter sets, according to an embodiment.

FIG. 6 displays a schematic diagram of an exemplary procedure for obtaining a filtered parameter set 103, as it may be performed by the encoder or decoder acting as the device 100 according to an embodiment of the disclosure. The procedure works in the same way for filtering the metadata 402 and for filtering the curve parameters 502, as described above. The procedure comprises the following steps:

Initially, at least a first parameter set 102 of a first HDR video frame 101 may be obtained 201, and the obtained first parameter set 102 may be pushed into a queue (not shown). Then, a second parameter set 102 of a second HDR video frame 101 may be obtained 201 (as shown). Then it may be detected (at block 601), if a scene change occurred between the first HDR video frame 101 and the second HDR video frame 101. The second parameter set 102 is pushed into the queue (at block 602) if there occurred no scene change (N at block 601). If there occurred a scene change (Y at block 601), the queue is cleared (at block 603). In the first case (N at block 601), an average of the parameter sets 102 in the queue may be computed (at block 604), as the temporal filtering step 202, to obtain the temporally filtered parameter set 103.

In an embodiment, the temporal filtering 202 of the plurality of parameter sets 102 comprises calculating a weighted average (as, e.g., done at block 604), or an average of at least a part of parameters of the plurality of parameter sets 102.

In particular, the weighted average of the queue can be calculated (at block 604), in order to get the filtered parameter set 103 of the HDR video frames 101 in the time domain. The temporal filtering 202 may be performed based on the following equation:

$$R = \Sigma_{k=1}^{n} Q(k) * w_k, \Sigma_{k=1}^{n} w_k = 1$$

wherein Q(k) is the kth value in the queue and $w_k$ is the weight. The sum of all weights equals 1. By default, all weights may be equal, i.e. w=1/n. In an embodiment, larger weights can be assigned for parameter sets of HDR video frames 101 closer to the current HDR video frame 101 (in FIG. 6 the "second frame"). Tests showed that such embodiments only provided small gains in quality compared to equal weights. Therefore, embodiments with equal gains provide an efficient implementation because they provide almost similar quality but are less complex. It should be noted that n may not always be the maximum length of the queue. At the beginning of a video or at the HDR video frame 101, where a scene cut (i.e. scene change) occurs, n may be reset to 0 and then may be increased by 1 frame by frame, until it reaches maximum length of the queue. Once the queue is full, it may follow the rule "first in, first out" rule. In other words, the parameter set 102 of the oldest HDR video frame 101 in the queue may be popped out, and the parameter set 102 of the newest HDR video frame 101 may be pushed in.

The procedure of FIG. 6 has the advantage that both time and computing resource can be saved by the temporal filtering 202 of the parameter sets 102, and—once the tone mapping curve 300 is computed based on the temporally filtered parameter set 103—the stability of the displayed contents may still be ensured with no flickering. The queue length for temporally filtering 202 can be dependent on the frame rate and by default the number of HDR video frames 101 in half a second to one second. For instance, if the frame rate of the HDR video is 30 fps (frames per second), then a reasonable queue length can be between 15 and 30. In an embodiment, a power of 2 may be taken as queue length, and, thus, 32 can be taken in a software for 30 fps, and 16 for 15 fps.

Figure 7:
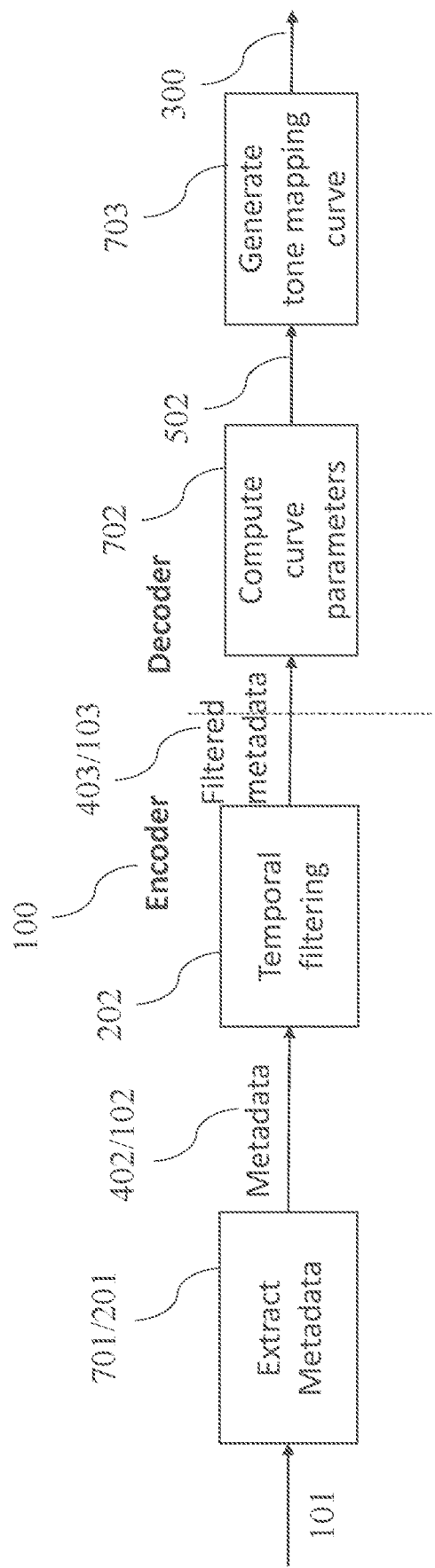
FIG. 7 shows a schematic diagram of a method according to an embodiment of the disclosure, wherein metadata is temporally filtered at the encoder.

This procedure of FIG. 7 can be used to temporally filter 202 the (e.g., basic) metadata 402, as well as to temporally filter 202 the curve parameters 502, e.g., the parameters m_p and m_a. In the artistic mode, the curve parameters m_p and m_a may be part of the enhanced metadata, too, and it is also possible to temporally filter the enhanced metadata.

Although embodiments of the disclosure comprise that the temporal filtering 202 can be applied to both metadata 402 and curve parameters 502, it may be more beneficial to filter metadata 402 for the following two reasons:

1) Curve parameters 502, like the parameters m_a and m_p, can be a non-linear function of metadata 402.

Filtering such curve parameters 502 in the non-linear domain may thus be more difficult to control. The metadata 402 may be more suitable for such linear filtering.

2) In automatic mode, filtering curve parameters 502 like the parameters m_a and m_p can only be used in the decoder. It may not be possible to filter the curve parameters 502 at the encoder, because they are not transmitted by the encoder to the decoder in the automatic mode. But filtering the metadata 402 can be conducted at the encoder, as well as at the decoder, in the automatic mode.

The above-mentioned embodiments provide the advantage that the computation complexity and memory requirements are reduced in comparison to temporally filtering the entire tone mapping curve 300. Moreover, the potential flickering phenomenon is avoided or reduced, and the stability of displayed contents can be guaranteed even when the scene changes rapidly between consecutive HDR video frames 101.

In the following, some specific embodiments for the first mode (e.g., for the automatic mode) are described with respect to FIG. 7-FIG. 9.

FIG. 7 shows an embodiment, in which the device 100 is the encoder in the system of encoder and decoder. In particular, temporal filtering 202 of metadata 402 (being the parameter sets 102) takes place at the encoder.

In particular, the encoder first extracts 701 (as the obtaining step 201) the metadata 402 from the plurality of HDR video frames 101. The metadata 402 is then temporally filtered 202 at the encoder. As for the temporal filtering 202, the same processing procedure as shown in FIG. 6 may be used for the metadata 402. After obtaining filtered metadata 403 (being the filtered parameter set 103), the filtered metadata 403 is provided to the decoder. The decoder computes 702 the curve parameters 502 based on the temporally filtered metadata 403. Further, the decoder generates 703 the tone mapping curve 300 based on the curve parameters 502.

Figure 8:
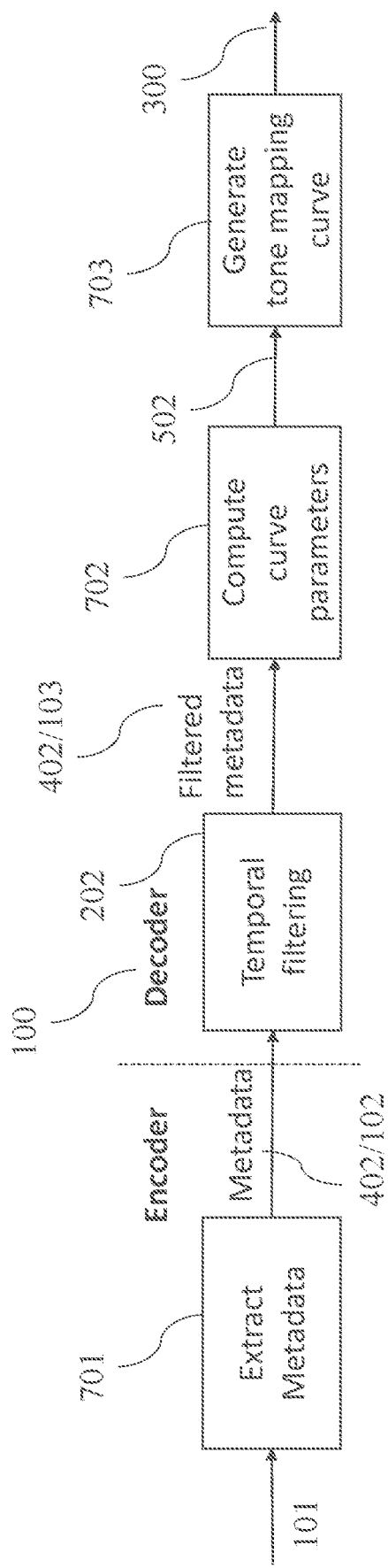
FIG. 8 shows a schematic diagram of a method according to an embodiment of the disclosure, wherein metadata is temporally filtered at the decoder.

FIG. 8 shows another embodiment, in which the device 100 is the decoder in the system of encoder and decoder. In particular, temporal filtering 202 of metadata 402 (being the parameters sets 102) takes place at the decoder.

In particular, the encoder first extracts 701 the metadata 402 from the plurality of HDR video frames 101, and sends the metadata 402 to the decoder. The decoder receives (as the obtaining step 201) the metadata 402, and temporally filters 202 the metadata 402 to obtain temporally filtered metadata 403 (being the filtered parameter set 103), As for the temporal filtering 202 at the decoder, the same processing procedure as shown in FIG. 6 may be used for the metadata 402.

After obtaining the filtered metadata 403, the tone mapping curve parameters 502 are calculated 702 at the decoder, in order to the generate 703 the tone mapping curve 300 at the decoder. FIG. 9 shows another embodiment, in which the device 100 is the decoder in the system of encoder and decoder. In particular, temporal filtering 202 of curve parameters 503 (being the parameter sets 102) takes place at the decoder.

In particular, the encoder first extracts 701 the metadata 402 from the plurality of HDR video frames 101, and sends it to the decoder. Then the decoder computes 702 (as the obtaining step 201) the curve parameters 502, and temporally filters 202 the curve parameters 502 to obtain temporally filtered curve parameters 503 (being the filtered parameter set 103). For the temporal filtering 202, the same processing procedure as shown in FIG. 6 may be used for the curve parameters 502. After obtaining the filtered curve parameters 503, the decoder generates 703 the tone mapping curve 300 based on the temporally filtered curve parameters 503.

In the following, some specific embodiments for the second mode (e.g., for the artistic mode) are described with respect to FIG. 10-FIG. 12.

Figure 10:
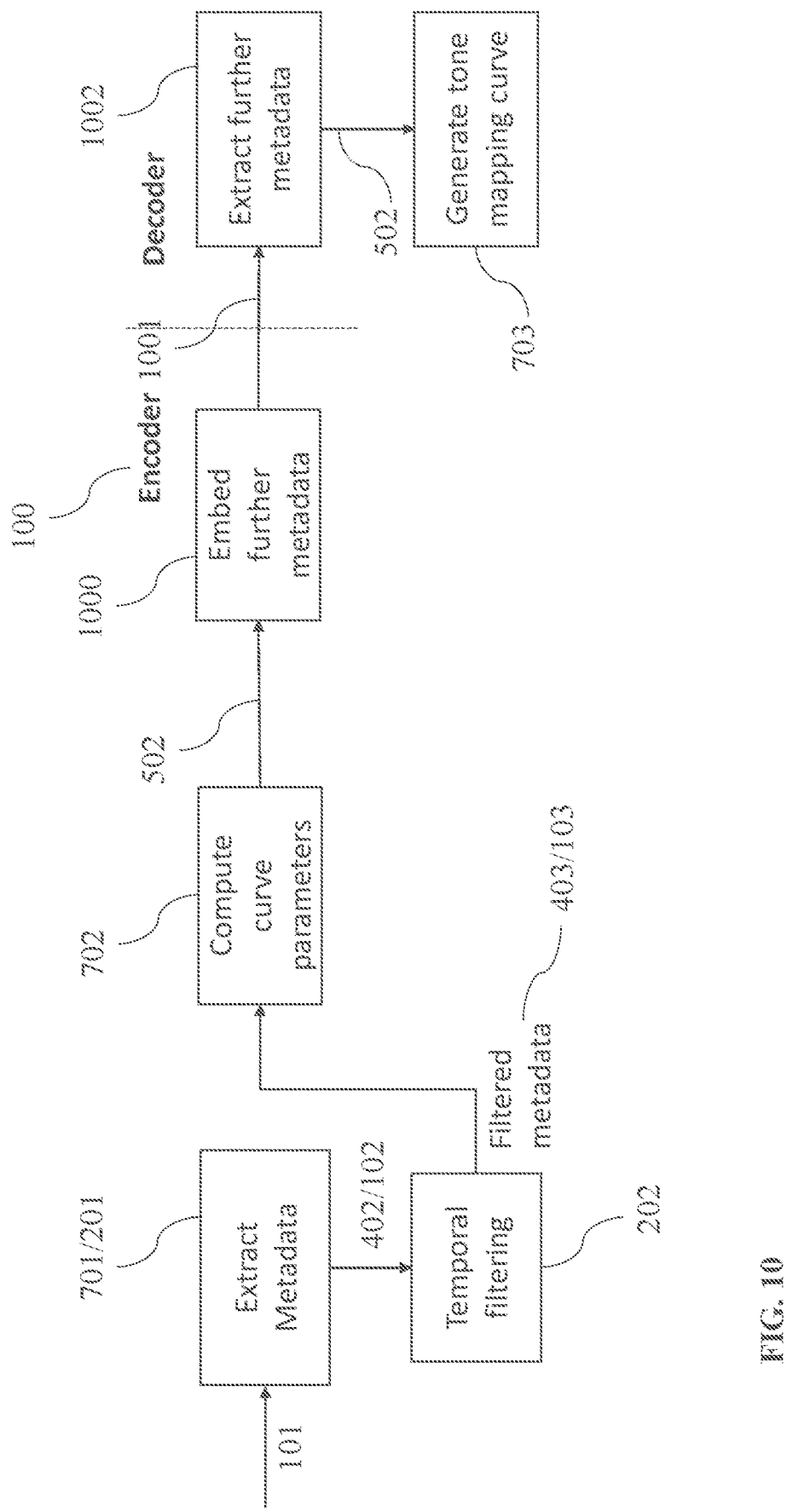
FIG. 10 shows a schematic diagram of a method according to an embodiment of the disclosure, wherein metadata is temporally filtered at the encoder.

FIG. 10 shows an embodiment, in which the device 100 is the encoder in the system of encoder and decoder. In particular, temporal filtering 202 of metadata 402 (being the parameter sets) takes place at the encoder.

In particular, the encoder first extracts 701 (as the obtaining step 201) the metadata 402 from the plurality of HDR video frames 101. The metadata is then temporally filtered 202 at the encoder to obtain filtered metadata 103 (being the temporally filtered parameter set 103). As for the temporal filtering 202, the same processing procedure as shown in FIG. 6 may be used for the metadata 402. After obtaining the filtered metadata 403, the encoder computes 702 the curve parameters 502, and may add 1000 the curve parameters as further metadata 401 to the metadata 402, to obtain extended metadata 1001. This extended metadata 1001 is sent to the decoder, which extracts the further metadata 401 therefrom, and thus the curve parameters 502, and generates 703 the tone mapping curve 300 based on these extracted curve parameters 502.

Figure 11:
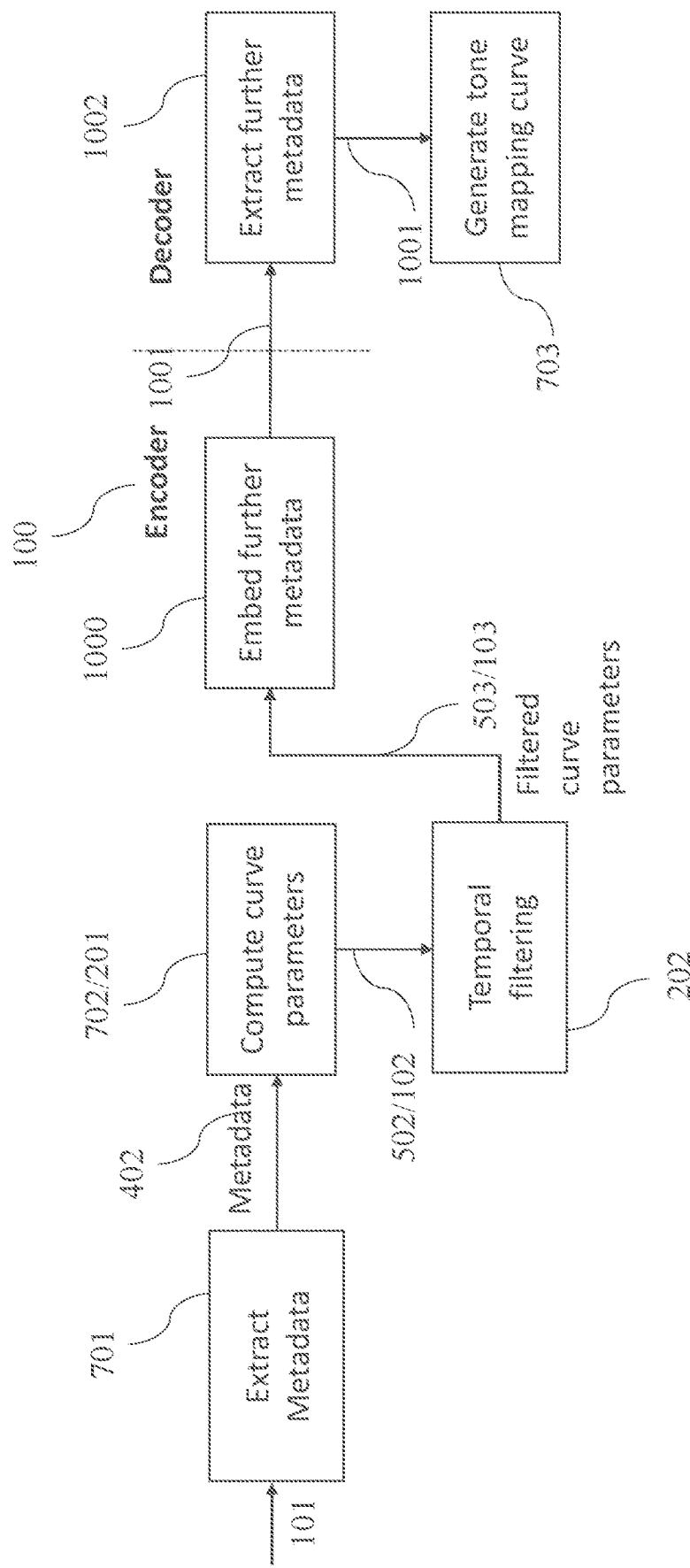
FIG. 11 shows a schematic diagram of a method according to an embodiment of the disclosure, wherein curve parameters of the tone mapping curve are temporally filtered at the encoder.

FIG. 11 shows an embodiment, in which the device 100 is the encoder in the system of encoder and decoder. In particular, temporal filtering 202 of curve parameters 502 (being the parameters sets 102) takes place at the encoder.

In particular, the encoder first extracts 701 the metadata 402 from the plurality of HDR video frames 101. The encoder then computes 702 (as the obtaining step 201) the curve parameters 502. The curve parameters 502 are is then temporally filtered 202 at the encoder to obtain filtered curved parameters 503 (being the temporally filtered parameter set 103). As for the temporal filtering 202, the same processing procedure as shown in FIG. 6 may be used for the curve parameters 502. After obtaining the temporally filtered curve parameters 503, the encoder may add 1000 the temporally filtered curve parameters 503 as further metadata 401 to the metadata 402, to obtain extended metadata 1001. This extended metadata 1001 is sent to the decoder, which extracts the further metadata 401 therefrom, and thus the temporally filtered curve parameters 503, and generates 703 the tone mapping curve 300 based on these curve parameters 503.

Figure 12:
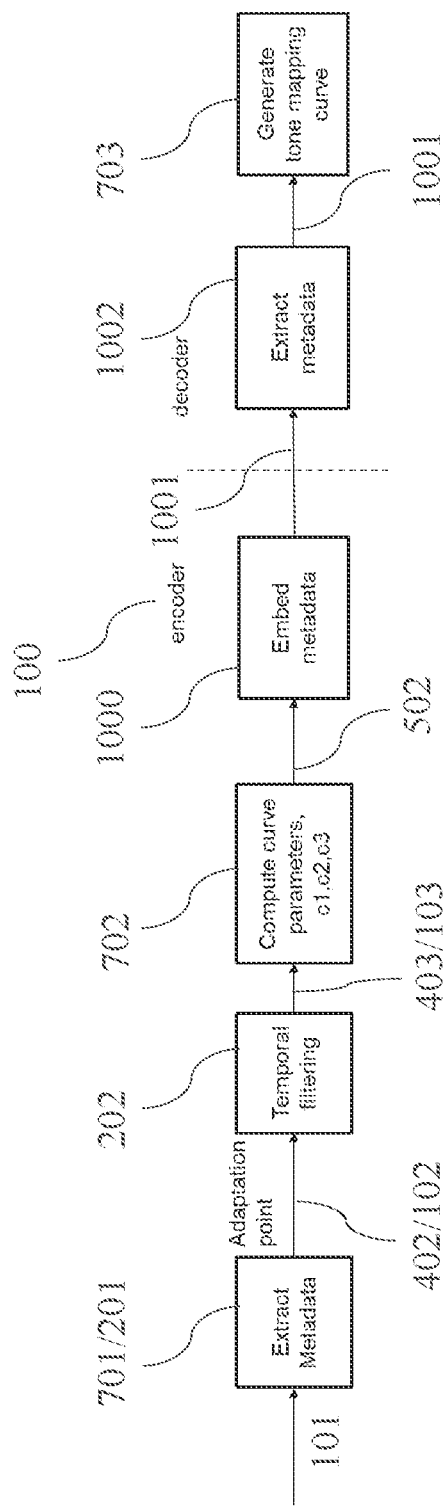
FIG. 12 shows a schematic diagram of a method according to an embodiment of the disclosure, wherein metadata is temporally filtered at the encoder.

FIG. 12 shows an embodiment, in which the device 100 is the encoder in the system of encoder and decoder. In particular, temporal filtering 202 of metadata 402 (being the parameter sets 102) takes place at the encoder.

FIG. 12 shows in particular an example for applying temporal filtering 202 of the metadata 402 for SMPTE 2094-10. In this embodiment, an "adaptation point", which is part of the metadata 402 (and thus part of the temporally filtered metadata 403 being the filtered parameter set 103), may be used by the encoder to compute 702 the tone mapping curve parameters 502 c1, c2 and c3. The temporal filtering 202 can particularly be applied to the adaptation point, i.e. to obtain a temporally filtered adaption point. The temporally filtered metadata 402 is then transmitted to the decoder as the further metadata 401 in the enhanced metadata 1001 (e.g., as embedded artistic mode metadata). Finally, the tone mapping curve 300 is generated 703 by the decoder based on the extracted further metadata 401, and thus the curve parameters 502.

Similarly, in SMPTE 2094-40, anchor points may be used to determine the curve parameters 502, and thus particularly temporal filtering 202 can also be applied to such anchor points. In SMPTE 2094-20 and 2094-30, three parameters 502 in the metadata 402 determine the tone mapping curve 300, including "ShadowGainControl", "MidtoneWidthAdjustmentFactor" and "HighlighGainControl", and thus temporal filtering 202 can particularly be applied to these three parameters.

In all of the above embodiments, the metadata 402 may be dynamic metadata, i.e., the metadata 402 may change from frame 101 to frame 101. Further, in all of the above embodiments, the curve parameters 502 may be the parameters m_a and m_p, which may be used to define the phoenix tone mapping curve 300.

Figure 9:
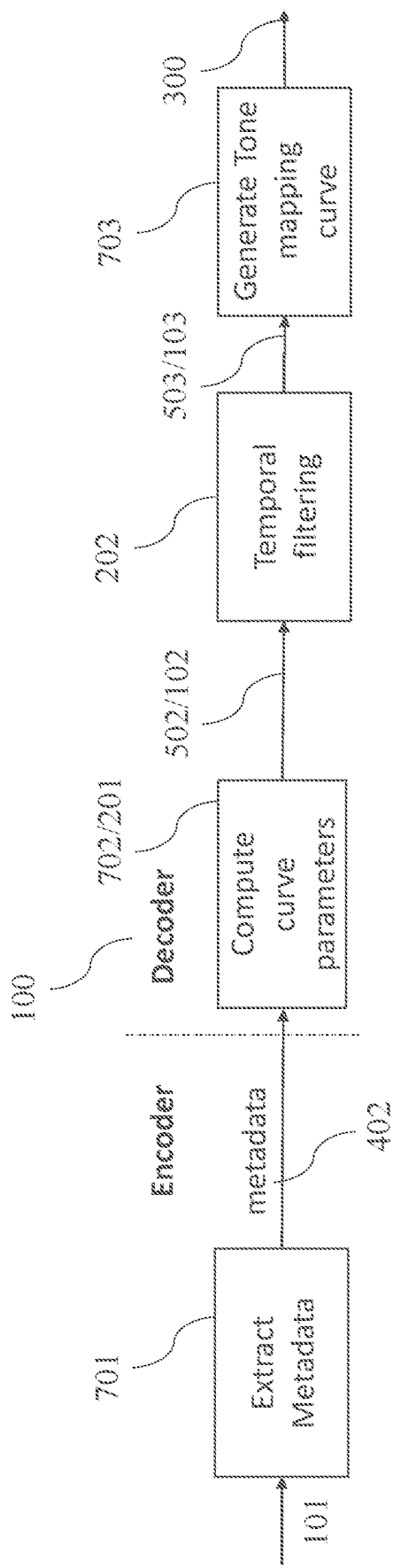
FIG. 9 shows a schematic diagram of a method according to an embodiment of the disclosure, wherein curve parameters of the tone mapping curve are temporally filtered at the decoder.

In the above embodiments shown in FIG. 9-FIG. 11, the metadata 402 may be used to compute curve parameters 502, e.g. before or after temporally filtering 202 the metadata 402. Then, cubic spline parameters and the computed curve parameters 502 may be combined as the further metadata 401 embedded in the enhanced metadata 1001.

FIG. 13 shows an example of a signal processing pipeline 1300 of an HDR dynamic tone mapping process configured to implement embodiments of the disclosure. The input of the system is the HDR video, e.g. HDR video frames of the HDR video. In general, this HDR video may be the output of the post-production stage, in which a colorist has edited the video using a color grading system for better quality or for certain artistic intent. The HDR video is of high peak brightness, and could be often 1000 nit, or 2000 nit, and in the near future 4000 nit or 10000 nit. Moreover, the pixel values of the video are in the PQ domain.

In the HDR preprocessing block 1301, the HDR video remains the same as the input. However, metadata is computed. Further, in the HDR video coding block 1302, the HDR video is compressed, e.g. by a video codec, e.g. a video codec according to H.265 or any other video standard (national, international or proprietary). Moreover, the metadata is embedded in the headers of the video stream, which is sent from the encoder to the decoder (or stored on a storage medium for later retrieval by a decoder). In the HDR video decoding block 1303, the decoder receives the HDR video bitstream, decodes the compressed (or coded) video, and extracts the metadata from the headers.

Furthermore, in the HDR dynamic tone mapping block 1304, a tone mapping is conducted, to adapt the HDR video to the display capacity.

For example, the HDR pre-processing block 1301 and/or the HDR dynamic tone mapping block 1304 may implement embodiments of the disclosure.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A method for determining a parameter set for a tone mapping-curve implemented by a decoder, the method comprising:
    obtaining, by the decoder, a plurality of parameter sets, wherein each parameter set defines a tone mapping curve, and wherein each parameter set is derived based on one of a plurality of High Dynamic Range (HDR) video frames;
    temporally filtering, by the decoder, the plurality of parameter sets to obtain a temporally filtered parameter set; and
    displaying the plurality of HDR video frames, by the decoder, based on the temporally filtered parameter set, wherein the tone mapping curve is obtained by:

$$L' = m\_a \left( \frac{m\_p \times L^{m\_n}}{(m\_p - 1) \times L^{m\_n} + 1} \right)^{m\_m} + m\_b,$$

wherein L is a brightness of an input pixel of a HDR video frame, m_n=1, m_m=2.4, and m_b is a predetermined perception quantization (PQ) value, wherein m_p is a brightness control factor and m_a is a scaling factor defining a maximum brightness of an output pixel, and wherein curve parameters of the tone mapping curve comprise m_p and m_a.

2. The method according to claim 1, wherein the temporally filtering the plurality of parameter sets comprises calculating a weighted average or an average of at least a part of parameters of the plurality of parameter sets.

3. The method according to claim 1, further comprising: generating the tone mapping curve based on the temporally filtered parameter set.

4. The method according to claim 1, wherein each parameter set directly or indirectly defines the tone mapping curve.

5. The method according to claim 1, wherein:
    each parameter set comprises metadata of the HDR video frame or curve parameters of the tone mapping curve.

6. The method according to claim 1, wherein
    each parameter set comprises metadata extracted from the respective HDR video frame, and
    the temporally filtered parameter set comprises temporally filtered metadata.

7. The method according to claim 6, further comprising: computing one or more curve parameters of the tone mapping curve based on the temporally filtered metadata.

8. The method according to claim 7, further comprising: generating the tone mapping curve based on the one or more curve parameters.

9. The method according to claim 1, wherein
    each parameter set comprises one or more curve parameters of the tone mapping curve computed based on metadata extracted from the respective HDR video frame, and
    the temporally filtered parameter set comprises one or more temporally filtered curve parameters.

10. The method according to claim 9, further comprising: generating the tone mapping curve based on the one or more temporally filtered curve parameters.

11. The method according to claim 1, further comprising: transmitting or storing the temporally filtered parameter set together with the plurality of HDR video frames.

12. The method according to claim 1, comprising:
    obtaining a first parameter set of a first HDR video frame and pushing the first parameter set into a queue;

obtaining a second parameter set of a second HDR video frame;

detecting whether a scene change is occurred between the first HDR video frame and the second HDR video frame, and pushing the second parameter set into the queue when no scene change is occurred;

computing an average of the parameter sets in the queue to obtain the temporally filtered parameter set.

13. The method according to claim 12, comprising:
clearing the queue when a scene change is occurred.

14. A decoder comprising:
one or more processors; and
a non-transitory computer-readable storage medium coupled to the one or more processors and storing programming instructions, that when executed by the one or more processors, cause the decoder to perform operations of:
obtaining a plurality of parameter sets, wherein each parameter set defines a tone mapping curve, and wherein each parameter set is derived based on one of a plurality of High Dynamic Range (HDR) video frames;
temporally filtering the plurality of parameter sets to obtain a temporally filtered parameter set; and
displaying the plurality of HDR video frames based on the temporally filtered parameter set,
wherein the tone mapping curve is obtained by:

$$L' = m\_a \left( \frac{m\_p \times L^{m\_n}}{(m\_p - 1) \times L^{m\_n} + 1} \right)^{m\_m} + m\_b,$$

wherein L is a brightness of an input pixel of a HDR video frame, m_n=1, m_m=2.4, and m_b is a predetermined perception quantization (PQ) value, wherein m_p is a brightness control factor and m_a is a scaling factor defining a maximum brightness of an output pixel, and
wherein curve parameters of the tone mapping curve comprise m_p and m_a.

15. The decoder according to claim 14, wherein the temporally filtering of the plurality of parameter sets comprises calculating a weighted average or an average of at least a part of parameters of the plurality of parameter sets.

16. The decoder according to claim 14, further comprising:
generating the tone mapping curve based on the temporally filtered parameter set.

17. The decoder according to claim 14, wherein each parameter set directly or indirectly defines the tone mapping curve.

18. The decoder according to claim 14, wherein each parameter set comprises metadata of the HDR video frame or one or more curve parameters of the tone mapping curve.

19. An encoder comprising:
one or more processors; and
a non-transitory computer-readable storage medium coupled to the one or more processors and storing programming instructions, that when executed by the one or more processors, cause the encoder to perform operations of:
obtaining a plurality of parameter sets, wherein each parameter set defines a tone mapping curve, and wherein each parameter set is derived based on one of a plurality of High Dynamic Range (HDR) video frames;
temporally filtering the plurality of parameter sets to obtain a temporally filtered parameter set; and
storing the temporally filtered parameter set,
wherein the tone mapping curve is obtained by:

$$L' = m\_a \left( \frac{m\_p \times L^{m\_n}}{(m\_p - 1) \times L^{m\_n} + 1} \right)^{m\_m} + m\_b,$$

wherein L is a brightness of an input pixel of a HDR video frame, m_n=1, m_m=2.4, and m_b is a predetermined perception quantization (PQ) value, wherein m_p is a brightness control factor and m_a is a scaling factor defining a maximum brightness of an output pixel, and
wherein curve parameters of the tone mapping curve comprise m_p and m_a.

* * * * *